2,471,038

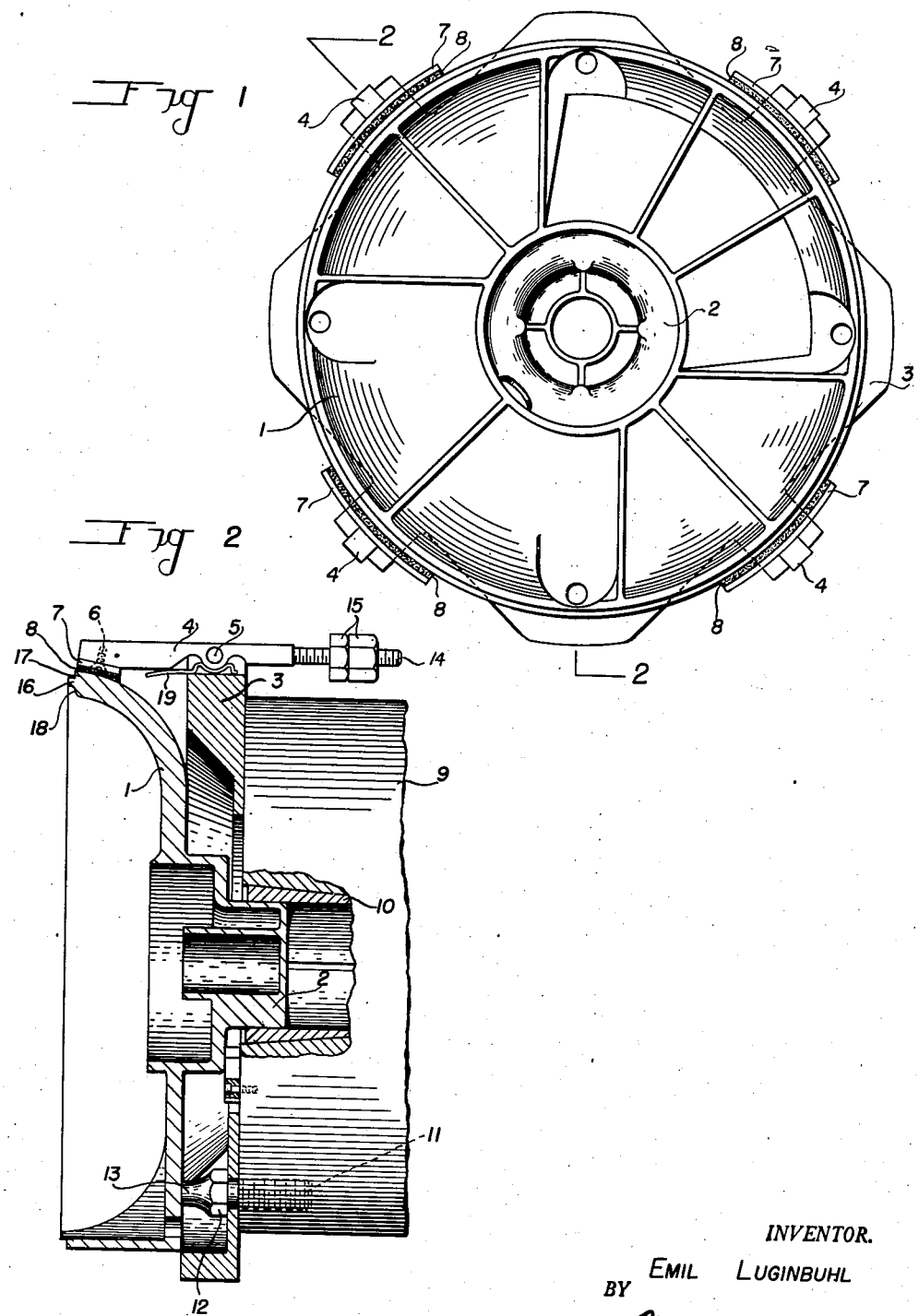
May 24, 1949.   E. LUGINBUHL   2,471,038
WORK CENTERING ATTACHMENT FOR METAL TURNING MACHINES
Filed Oct. 29, 1946
INVENTOR.
EMIL LUGINBUHL
BY
ATTORNEY Patented May 24, 1949

UNITED STATES PATENT OFFICE 2,471,038

WORK CENTERING ATTACHMENT FOR METAL TURNING MACHINES

Emil Luginbuhl, Bedford, Ohio, assignor to Jack & Heintz Precision Industries, Inc., Cleveland, Ohio, a corporation of Delaware Application October 29, 1946, Serial No. 706,452

6 Claims. (Cl. 279—51)

This invention relates to work holding attachments for metal working machines and has for one of its primary objects to provide such an attachment that will center the work and eliminate chatter while rotating at high speeds whether the work has out-of-balance parts or is of light-weight and flimsy metallic material.

Another object of the invention is to provide in such work holding attachment suitable clamping means for engaging the outer surface of the work with adjustable weights responsive to the centrifugal force of the rotating work holder for varying the clamping forces for centering the out-of-balance work.

With the foregoing and other objects in view, the invention resides in the combination of parts and in the details of construction hereinafter set forth in the following specification and appended claims, certain embodiments thereof being illustrated in the drawings, in which:

Figure 1 is a view in end elevation showing the work, in the form of a casting of light-weight metal, and the four clamping members of the work holder engaging the outside surface of the work; and Figure 2 is a view in section taken along line 2—2 of Figure 1, showing the work held by the work holder by clamping members with pivoted arms and adjustable centrifugally responsive weights thereon.

Referring more particularly to the drawings, the work 1 may be a very thin, flimsy and flexible casting of aluminum, or other light-weight metal, for the end wall of an electric motor housing, including a hollow sleeve 2 protruding from its convex outer side.

The work holding device includes a centrally apertured plate 3 to which four arms 4 are pivotally connected at 5. To one end of each arm is secured, by means of set screws 6, an arcuate plate 7 faced with a shock-absorbing pad 8 which pads engage the outside convex surface of the work.

The assembly, as shown in Figure 2, includes a chuck 9 with a tapered wedge bushing 10 to receive the sleeve 2 of the work. The work holder 3 is shown secured to the chuck by screw bolts 11 which have nut portions 12 and extensions 13 acting as limit stops for the positioning of the work.

The other end of each arm 4 is screw threaded at 14 to receive adjustable centrifugal weight nuts 15. A leaf spring 19 is provided to bear upwardly on the forward end of each arm 4. Upon rotation of the assembly, centrifugal force will cause each arm 4 to rotate counter-clockwise about its pivot 5 against the action of each spring 19. Equal amounts of inward clamping pressure on the work will be exerted by the arms through their pads 8 when the arms are uniformly balanced by the adjustable centrifugal weight nuts 15. If for any reason the work to be machined is out of balance, a correction may be made by manually adjusting one or more of the weight nuts 15 so that a greater inward clamping force will be exerted against the heavy side of the work.

For example, the machining operation in the present showing on the work may be on its inner edge 16 or the outer or inner shoulder 17 or 18, respectively, on either side or edge 16.

I claim:

1. In a device for holding and centering work for machining operation thereon, the work consisting in a thin light weight metallic bell shaped plate with a centrally located extension on its convex side, a chuck, a work holder detachably secured to said chuck and including means for gripping said central extension of said work, leaving the remainder of said work spaced from said work holder, a plurality of pivoted centrifugally responsive arms on said work holder adapted to be forced into clamping engagement with said work upon rotation of said work holder.

2. In a device for holding and centering work for machining operation thereon, the work consisting in a thin light weight metallic bell shaped plate with a centrally located extension on its convex side, a chuck, a work holder detachably secured to said chuck and including means for gripping said central extension of said work, leaving the remainder of said work spaced from said work holder, a plurality of pivoted centrifugally responsive spring loaded arms on said work holder adapted to be forced into clamping engagement with said work upon rotation of said work holder.

3. In a device for holding and centering work for machining operation thereon, the work consisting in a thin light weight metallic bell shaped plate with a centrally located extension on its convex side, a chuck, a work holder including a plate detachably secured to said chuck, means for gripping said central extension of said work, leaving the remainder of said work spaced from said work holder, a plurality of arms pivoted to said plate and carrying on their one end adjustable weights, the other ends of said arms being adapted to engage the outer surface of said work, said weights being responsive to the centrifugal force of rotation of said plate to force said arms into clamping engagement with said work upon rotation of said work holder.

4. In a device for holding and centering work for machining operation thereon, the work consisting in a thin light weight metallic bell shaped plate with a centrally located extension on its convex side, a chuck, a work holder including a plate detachably secured to said chuck, means for gripping said central extension of said work, leaving the remainder of said work spaced from said work holder, a plurality of arms pivoted to said plate and carrying on their one end adjustable weights, the other ends of said arms having shock-absorbing pads for engaging the outer surface of said work, springs normally tending to force said pads away from said work, said weights being responsive to the centrifugal force of rotation of said plate to force said pads into clamping engagement with said work against the action of said springs upon rotation of said work holder.

5. In a device for holding and centering work for machining operation thereon, the work consisting in a thin light weight metallic bell shaped plate with a centrally located extension on its convex side, a chuck, a work holder including a plate detachably secured to said chuck, means for gripping said central extension of said work, leaving the remainder of said work spaced from said work holder, a plurality of weighted arms pivoted to said plate for engaging the outer surface of said work, springs normally tending to force said arms away from said work, said weights being responsive to the centrifugal force of rotation of said plate to force said pads into clamping engagement with said work against the action of said springs.

6. In a device for holding and centering work for machining operation thereon, the work consisting in a thin light weight metallic bell shaped plate with a centrally located extension on its convex side, a chuck, a work holder including a plate detachably secured to said chuck, means for gripping said central extension of said work, leaving the remainder of said work spaced from said work holder, a plurality of weighted arms pivoted to said plate for engaging the outer surface of said work, said arms being responsive to the centrifugal force of rotation of said plate to force said arms into clamping engagement with said work upon rotation of said work holder.

EMIL LUGINBUHL.

REFERENCES CITED

The following references are of record in the file of this patent:

UNITED STATES PATENTS

| Number | Name | Date |
|---|---|---|
| 1,403,415 | Iggberg | Jan. 10, 1922 |

FOREIGN PATENTS

| Number | Country | Date |
|---|---|---|
| 19,332 | Great Britain | 1912 |
| 53,983 | Germany | 1890 |
| 526,948 | France | 1921 |